United States Patent [19]

Neubeck et al.

[11] 4,108,007
[45] Aug. 22, 1978

[54] MANOMETERS WITH MEASUREMENT RANGE MULTIPLICATION

[75] Inventors: Kurt Neubeck, Miltenberg, Main; Karl-Heinz Schwing, Amorbach; Kurt Klein, Röllfeld, all of Fed. Rep. of Germany

[73] Assignee: Alexander Wiegand GmbH u. Co., Armaturen- u. Manometeneabrik, Klingenber, Fed. Rep. of Germany

[21] Appl. No.: 798,827

[22] Filed: May 20, 1977

[51] Int. Cl.[2] .............................................. G01L 7/04
[52] U.S. Cl. .......................................................... 73/732
[58] Field of Search ................... 73/397, 418, 411–417

[56] References Cited

U.S. PATENT DOCUMENTS

| 1,169,982 | 2/1916 | Manning | 73/397 |
| 1,414,121 | 4/1922 | Gabel | 73/397 |
| 1,414,133 | 4/1922 | Ingham | 73/397 |

Primary Examiner—Donald O. Woodiel
Attorney, Agent, or Firm—Naylor, Neal & Uilkema

[57] ABSTRACT

Manometers with a tube spring metering element are provided with multiple range measurement capability by means of a stop element which is adjustable and yieldable so as to convert non-linear movement of the associated part of the tube spring metering element to linear movement.

4 Claims, 2 Drawing Figures

MANOMETERS WITH MEASUREMENT RANGE MULTIPLICATION

SUMMARY OF THE INVENTION

The invention relates to manometers with a tube spring metering element with measurement range multiplication, whose total measurement range is divided into two different ranges, measurement of the higher range starting from a predetermined pressure level, being accomplished by a change of the spring rate of the metering element, in that deflection of the metering element is limited at the maximal point of the lower pressure measurement range by means of stop elements.

In the pressure measurement technology, there are instances where low as well as high pressures of a pressure medium are measured with a manometer at the identical measuring point.

In order to be able to comprehend different pressure levels with a single metering element of the manometer, such manometers are constructed for example so that when a circular scale is used, the indicating scale for the entire measurement range is divided into 350°.

For two ranges to be indicated on a scale graduation of 350°, the scale may be divided so that the range of the lower pressure, for example 0 – 10 bar, is indicated on 0° – 270°, and the range of the higher pressure, for example 10 –60 bar, on the 270° – 350° scale graduation.

Transition from the low to the high pressure measurement range is induced by a forced change of the spring constant of the metering element, in that, at the maximal point of the low range (10 bar), a part of the total length of the metering element is caused to run against stop elements, thereby preventing further deflection at still higher pressures. The remaining part of the metering element may, however, deviate further at increased pressures, since it is disposed outside the effective range of the stop elements. In relation to the total length of the tube spring metering element, the part disposed outside the stop elements has a different spring constant and thus results in a different pressure-proportional rise which serves for measuring the higher pressure range.

To compensate for manufacturing tolerances and to achieve a specific class of accuracy, the metering system of the manometers must be adjusted.

In the case of manometers of the above-mentioned type, adjustment in the lower pressure measurement range is made on the metering elements in conventional manner. In the higher range, adjustment on the metering element is no longer possible, since otherwise the previously adjusted lower range will become misadjusted.

In order to satisfy adequately the accuracy requirements also in the higher range, it is necessary to compensate the relatively high inaccuracy of indication in the high pressure measurement range caused by the material of the tube spring metering element, the soldering point at the end of the spring, and the outermost stop element which limits the deflection of the metering element.

In order to make adjustments of the tube spring metering element of manometers, particularly under operational conditions, it is practical to provide adjustment mechanisms outside the casing, thus providing the possibility for readjustment.

In U.S. Pat. No. 1,663,313, an adjustment device is described having an adjustment screw projecting to the outside through an oblong hole in the casing and connected with a flexible device comprising two arcuate leaf springs which work in opposite directions. The ends of the leaf springs are connected with the end piece of the tube spring and with the tie rod of the pointer mechanism respectively. By rotating the adjustment screw, the leaf springs are urged toward each other or away from each other, whereby the tie rod moves the toothed segment of the pointer mechanism and allows correction of the zero point position of the indicator.

The underlying object of the invention is to provide the possibility for adjusting the higher pressure measurement range for manometers with two ranges.

In accordance with the invention, the problem is solved in that the part serving for measuring the higher pressure range is adjustable by means of an adjustable springy stop element.

The advantage which may be achieved with the present invention consists in that the influence of the soldering point on the end piece of the spring, the distance of the adjustable stop element from the end of the metering element, and other factors which cause inaccurate indication, may be kept within narrow tolerances.

This results in essential simplification in the manufacture of the instrument dials since, based on the invention, they may be mass produced with linear scale graduation.

Further developments of the invention are characterized in the subclaims.

An embodiment of the invention is illustrated in the attached drawings and is described in greater detail hereinbelow.

Figure 1:
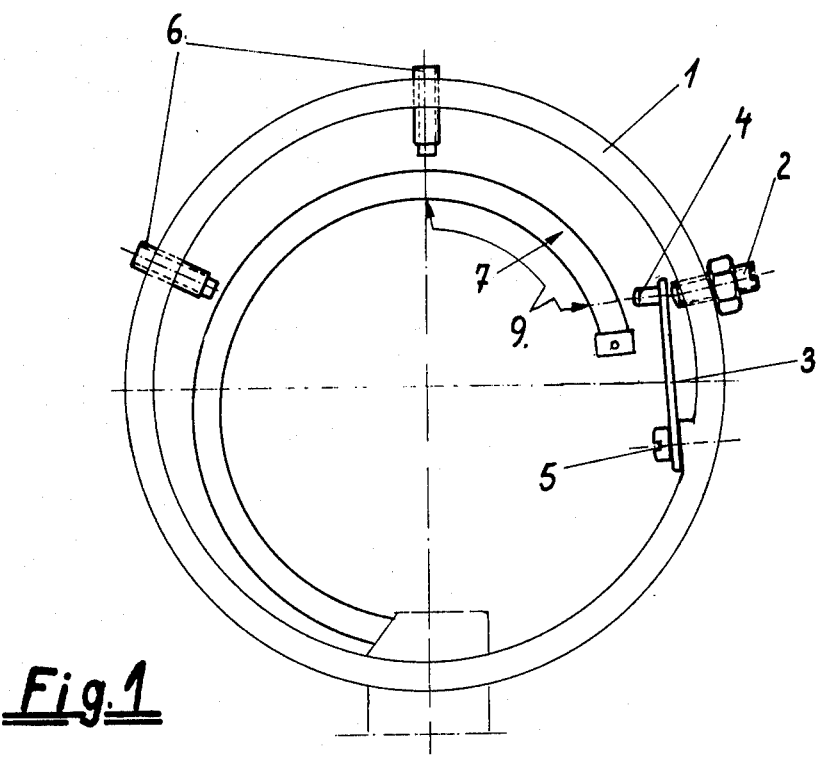
FIG. 1 is the interior view of a manometer embodying the invention.
Figure 2:
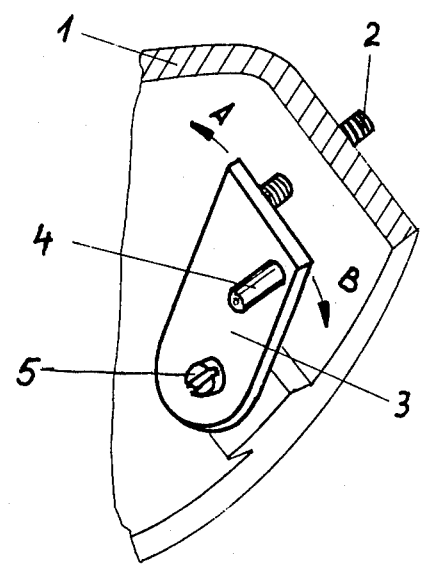
FIG. 2 shows the adjustable stop element in perspective view.

In the lower pressure measurement range, the entire effective length of the tube spring metering element 7 is used for measuring. During pressure admission, the stop elements 6 and stop pin 4 prevent deflection of the metering element 7 past the predetermined maximal point of the lower pressure measurement range. When pressure rises even further, the pressure obtaining is indicated via the part 9 of the metering element 7 located between the stop pin 4 and the stop element 6.

Due to the shorter spring length of the part 9 in relation to the total length of the metering element 7, a different spring constant and thereby a change of the pressure-proportional rise becomes effective which, as described above, is indicated for example in the range of 270° – 350° of the manometer scale, corresponding to 10 – 60 bar.

In order to be able to adjust the part 9 of the metering element 7, the last stop element against which the metering element abuts during pressure admission, is, in accordance with the invention, made of a spring-elastic element, preferably a leaf spring 3 with a stop pin 4 connected thereto. Said leaf spring is, on the one hand, held on the inner side wall of the manometer casing 1 with a stop screw 5. On the other hand, the leaf spring 3 may be adjusted by means of an adjustment screw 2, provided in the side wall of the housing, whereby the distance from stop pin 4 to metering element 7 is adjusted for fixing the maximal point of the low pressure measurement range.

Further, the stop pin 4 is disposed on the leaf spring 3 laterally to the axis of symmetry of the leaf spring 3 and, also, offset in relation to the point of support of the adjustment screw on the spring 3. After release of the stop screw 5, the leaf spring 3 may be adjusted laterally, so that the position of the stop pin 4 is thereby varied in relation to the point of support of the adjustment screw 2.

When the pressure is increased past the maximal point of the low pressure measurement range, the part 9 of the metering element 7 is urged against the stop pin 4. This generates a force which causes rotation, i.e. torque-induced twisting, of the leaf spring 3 and effects a spring deflection of the part 9 which is the greater the wider the space provided between the stop pin 4 and the point of support of the adjustment screw 2 on the leaf spring 3.

In an extreme case, the leaf spring 3 can be adjusted so that the point of support of the screw 2 is located in alignment with the stop pin 4. In this case, the force exerted by the metering element 7 on the leaf spring 3 cannot twist the leaf spring 3, and this then corresponds to the performance of the rigid stop element 6.

The stop elements 6 are not a necessary feature of the invention. Either or both may be eliminated without affecting the above-described mode of operation of the invention.

Because of the above-described adjustability of the leaf spring 3, the proportionality movement of the part 9, i.e. unit of movement of part 9 per unit of increase in pressure, may be variably controlled, and the normally non-linear movement of part 9 may be rendered linear in relation to a change in pressure.

What is claimed is:

1. A manometer comprising a casing, a tube spring metering element mounted therein having a fixed end and a free end, first means responsive to a predetermined degree of expansion movement of said element to change the effective spring rate thereof so that a unit of subsequent expansion movement indicates an increased rate of increase of the pressure to be measured, said first means comprising a yieldable stop member carried by said casing and disposed in the path of movement of said free end, and second means to selectively increase and decrease the resistance offered by said member to movement of said free end.

2. A manometer comprising a casing, a tube spring metering element mounted therein having a fixed end and a free end, first means responsive to a predetermined degree of expansion movement of said element to change the effective spring rate thereof so that a unit of subsequent expansion movement indicates an increased rate of increase of the pressure to be measured, said first means comprising a yieldable stop member disposed in the path of movement of said free end, and second means to selectively increase and decrease the resistance offered by said member to movement of said free end, said first means comprising a leaf spring having a fixed end and a free end, the fixed end of said leaf spring being secured to the casing by a stop screw, said second means comprising a first stop member carried by said casing in engagement with one side of the free end of said leaf spring and a second stop member at the other side of said free end of said leaf spring engageable with the free end of said tube spring metering element.

3. A manometer according to claim 2, said first stop member being adjustable to variably control the point of change of said spring rate.

4. A manometer according to claim 3, said stop screw being releasable for adjusting pivotal movement of said leaf spring to vary the distance of off-set on said leaf spring of the points of engagement therewith of said first stop member and said second stop member.

* * * * *